Mar. 20, 1923. Re. 15,564

R. W. WILSON

CONTAINER

Original Filed Nov. 28, 1921

Ralph W. Wilson,
Inventor,

By his Attorneys, Dodson & Roe

Reissued Mar. 20, 1923. Re. 15,564

UNITED STATES PATENT OFFICE.

RALPH W. WILSON, OF NEW YORK, N. Y., ASSIGNOR TO THEO. W. FOSTER & BRO. CO., OF PROVIDENCE, RHODE ISLAND.

CONTAINER.

Original No. 1,411,653, dated April 4, 1922, Serial No. 518,111, filed November 28, 1921. Application for reissue filed January 27, 1923. Serial No. 615,240.

*To all whom it may concern:*

Be it known that I, RALPH W. WILSON, a citizen of the United States, residing at New York, county of Kings, and State of New York, have invented a certain new and useful Improvement in Containers, of which the following is a specification.

My invention relates to that class of containers which are employed for toilet powders and rouge, etc., and has for its object to provide a construction which will not only hold both the rouge and powder compact in a single receptacle but will provide means of ready and convenient access thereto.

My means of accomplishing the foregoing objects may be more easily understood by having reference to the accompanying drawing, which is hereunto annexed and is a part of this specification, in which.

Similar reference numerals refer to similar parts throughout the entire description.

Figure 1:
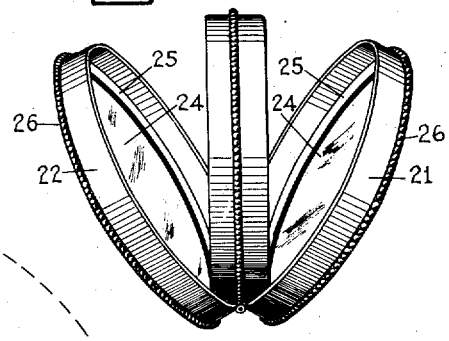
Fig. 1 is a perspective view of my improved device with the two sides or covers open.
Figure 3:
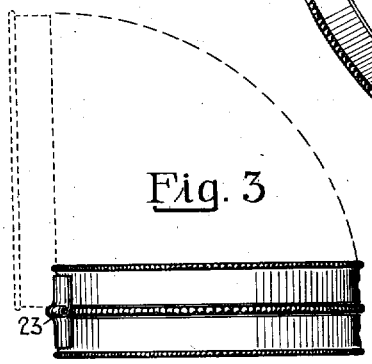
Fig. 3 is a side elevation of the device with both sides or covers closed, one of the covers being shown in dotted lines in open position.
Figure 2:
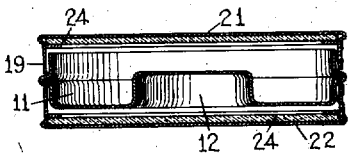
Fig. 2 is a cross section through the center of the device.
Figure 4:
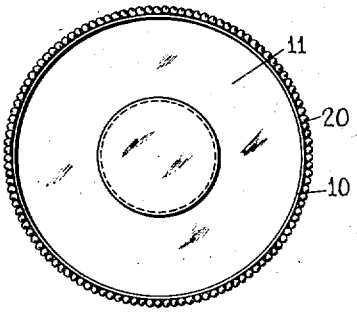
Fig. 4 is a top or plan view of the powder and rouge container.
Figure 5:
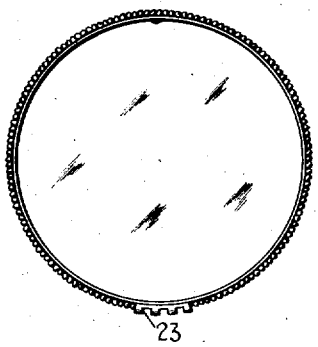
Fig. 5 is a plan view of one of the covers.
Figure 6:
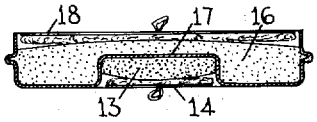
Fig. 6 is a cross section of the powder and rouge container together with the pads for using them.

As shown in the drawings my device comprises a powder and rouge container 10, which is formed with an annular space 11, which surrounds a recess 12, which is adapted to receive a quantity of rouge 13. A pad 14, of chamois or other suitable material may be placed adjacent the outer part of the rouge. The powder 16 is preferably formed in a compact and extends entirely over the wall 17 forming a bottom to the recess 12 in which the rouge is located. A pad 18, formed of chamois or any other suitable material may be placed adjacent the outer surface of the powder compact 16. It will be apparent that in this construction I provide for an amount of powder largely in excess of the amount of rouge. This is desirable since a much larger portion of the powder is used and the user will not have to throw away a lot of rouge when the powder is used up as is the case when they are in equal proportions. The external wall 19, of the container 10, is provided with an ornamental beading 20. The container is then placed inside of the two hinged covers 21 and 22 which are suitably connected in spaced relationship by a hinge 23 of the usual construction but which is so mounted upon the covers as to provide sufficient space between the hinge 23 and the beading 20 on the container. Preferably, I mount a mirror 24 inside of each of the covers 21 and 22, these mirrors being held in place by an annular band 25 or any other suitable and convenient fastening means may be employed if desired. The upper edge of each of the covers 21 and 22 is provided with beading 26 which preferably conforms in configuration to the beading 20, on the container 10. In use, the container 10 is first filled with rouge and powder compacts when it is placed between the two covers as shown in Fig. 1. The pads 14 and 18 are placed over the powder and rouge and the covers are then closed down upon it. The flanges of the covers telescope the container until they meet the beading 20 at which time their outer surfaces will be parallel, for as already pointed out, they are hinged in spaced relationship, when by opening the cover as clearly shown in the dotted lines in Fig. 3, access can be had to the powder, the pad 18 being instantly available for use and the mirror in the back of the cover 21 being visible to enable the user to apply the powder in a satisfactory manner. By closing the cover 21 and turning the box over and opening the cover 22, the rouge is also available, the mirror in the cover 21 furnishing a satisfactory means whereby the user may perform the required toilet operations satisfactorily. It will be apparent from the foregoing description that it is unnecessary to carry two boxes to obtain either powder or rouge since they are held in a single container and that the opening of the box to secure access to either one makes the mirrors, 24 located inside of the covers, instantly available for use. The beading 20 furnishes a very desirable finger hold for holding the container in whichever cover it is desired to keep it, while the beading 26 affords a very satisfactory finger holding for opening the covers, the operator being able to grasp the end cover and the beading 26 and hold it with the fingers and thumb of one hand while the fingers and thumb of the other can grasp the beading 26 and swing the cover back on the hinge 23 as clearly shown in Figs. 2 and 3.

It will be apparent from the foregoing description that in this construction, I have provided a very compact article but one in which the contents are readily and conveniently accessible, when it is desired to make use of them.

Having described my invention what I regard as new and desire to obtain by Letters Patent is:

1. A vanity box comprising a pair of flanged covers hinged in spaced relation and a container to be secured between them, said container being recessed on one side to receive a powder compact and provided on its reverse side with a smaller recess to receive a rouge compact.

2. A container having an annular recess on one side a central recess on the other, the bottom of which is below the plane of the top of the other side, a pair of flange covers hinged in spaced relation which telescope the external wall of said container, a mirror inside of each of said covers, a quantity of powder in the annular recess, a quantity of rouge in the central recess, a pad intermediate each of the mirrors and the powder and rouge.

3. A vanity box comprising a pair of covers secured in spaced relation to each other, a container fitted within the space formed between the covers, a powder compact secured to one side of said container and a smaller rouge compact on the other side thereof.

4. A vanity box comprising a pair of covers secured in spaced relation to each other, a container fitted within the space formed between the covers and having an annular raised portion projecting outwardly between them, a powder and rouge compact carried by said container.

5. A vanity box comprising covers secured in spaced relation to each other and a removable container fitted between them and adapted to maintain their proper spaced relationship, said container also functioning to hold powder and rouge compacts.

6. A vanity box comprising a body portion positioned between and designed to be telescopically engaged by two removable covers secured in spaced relation to each other, a powder compact secured to one side of said body portion and a rouge compact secured on the other side thereof.

7. A vanity box comprising two covers secured in spaced relation to each other and a container with an annular spacing bead formed thereon, mounted between the covers in such manner that when a cover is closed the spacing bead determines its limit of movement on the container, a powder compact carried by one side of the container and a smaller rouge compact by the other side thereof.

8. A vanity box comprising a pair of covers secured in spaced relation to each other and a powder and rouge carrying plate removably positioned between them and engaged by the covers when they are closed.

9. A vanity case comprising a pair of covers secured in spaced relation to each other and a powder and rouge carrying plate removably positioned between them and engaged by the covers when closed, said plate having an annular raised portion projecting between the covers.

10. A vanity case comprising a pair of covers secured in spaced relation to each other, a plate designed to be loosely fitted between the spaced covers, a powder compact secured to one side of said plate and a smaller rouge compact secured to the other side thereof.

11. A vanity box comprising a cover secured to, and spaced from, the body of the box and a container fitted removably in the body portion and designed to be engaged by the cover when closed and position it in spaced relation from the box, said container carrying a rouge and a powder compact.

In testimony whereof, I have signed the foregoing specification.

RALPH W. WILSON.